US010070629B2

(12) United States Patent
Roche (10) Patent No.: US 10,070,629 B2
(45) Date of Patent: *Sep. 11, 2018

(54) SELF-CLEANING PRE-FILTER FOR A WATER CIRCULATION PUMP

(71) Applicant: Stephen D. Roche, Nashville, TN (US)

(72) Inventor: Stephen D. Roche, Nashville, TN (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/317,496

(22) Filed: Jun. 27, 2014

(65) Prior Publication Data

US 2014/0305880 A1    Oct. 16, 2014

Related U.S. Application Data

(63) Continuation of application No. 13/836,649, filed on Mar. 15, 2013, now Pat. No. 8,800,496.

(51) Int. Cl.

| A01K 63/04 | (2006.01) |
|---|---|
| C02F 3/32 | (2006.01) |
| C02F 1/00 | (2006.01) |
| B01D 35/02 | (2006.01) |
| C02F 103/00 | (2006.01) |

(52) U.S. Cl.
CPC .......... *A01K 63/045* (2013.01); *A01K 63/04* (2013.01); *B01D 35/02* (2013.01); *C02F 1/001* (2013.01); *C02F 3/32* (2013.01); *C02F 2103/007* (2013.01); *C02F 2303/24* (2013.01)

(58) Field of Classification Search
USPC .......... 119/230, 259, 260, 227; 210/167.21, 210/167.22, 170.02, 602, 798, 411
See application file for complete search history.

(56) References Cited

U.S. PATENT DOCUMENTS

| 4,058,465 A | 11/1977 | McKee | |
|---|---|---|---|
| 4,261,822 A * | 4/1981 | Richardson | .......... B01D 33/073 210/107 |
| 4,848,275 A | 7/1989 | Swanson | |

(Continued)

FOREIGN PATENT DOCUMENTS

CN    101857310    10/2010

OTHER PUBLICATIONS

PondMaster Combination Filter/Pump/Fountain Kit—ww.ponddoc.com/store/filters/pondmaster/pondmasterkits.html.

*Primary Examiner* — Andrea Valenti (74) *Attorney, Agent, or Firm* — Greenspoon Marder LLP (57) ABSTRACT

A water circulation pump pre-filter unit (PFU). The PFU is submerged and provides structure to camouflage the system to give a natural and aesthetic look. The PFU comprises at least two cleaning systems: (1) biological cleaning mechanism; and (2) an internal self-cleaning mechanism. Specifically, the PFU comprises several filtering surfaces that form a repository for pond debris on which fish and other aquatic creatures feed, i.e., the biological cleaning mechanism. These filtering surfaces of the PFU also provide a protective barrier that prevents large debris from entering the circulation pump. The internal self-cleaning mechanism is a spray wash water source mechanism used to clean the PFU without removing the PFU or fish from the pond or entering the water. Together these features improve the quality of the water in the pond and extend the life of a pump.

26 Claims, 5 Drawing Sheets

(56) References Cited

U.S. PATENT DOCUMENTS

| | | | |
|---|---|---|---|
| 5,171,437 A * | 12/1992 | Fletcher, Sr. | A01K 63/045 119/261 |
| 5,192,429 A * | 3/1993 | Bader | B01D 29/15 210/170.09 |
| 5,254,252 A | 10/1993 | Drenner | |
| 5,667,683 A | 9/1997 | Benian | |
| 5,851,087 A * | 12/1998 | Berry, III | B01D 29/15 210/154 |
| 6,089,790 A * | 7/2000 | Berry, III | B01D 29/15 138/41 |
| 6,290,844 B1 * | 9/2001 | Tennyson, Jr. | A01K 63/045 119/259 |
| 6,508,933 B2 * | 1/2003 | Wilkins | B01D 29/05 210/170.09 |
| 6,709,580 B2 | 3/2004 | Ouwinga | |
| 6,755,981 B2 | 6/2004 | Terato | |
| 7,001,506 B2 | 2/2006 | Anderson | |
| 7,575,677 B1 * | 8/2009 | Barnes | B01D 29/111 210/170.01 |
| 7,828,964 B1 | 11/2010 | Neibert | |
| 8,006,646 B2 | 8/2011 | Grad | |
| 8,197,681 B2 | 6/2012 | Koskey, Jr. | |
| 8,440,073 B2 * | 5/2013 | Chen | A01K 63/006 119/259 |
| 2004/0040902 A1 | 3/2004 | Hill et al. | |
| 2004/0094470 A1 | 5/2004 | Jackson | |
| 2006/0021920 A1 | 2/2006 | Forbes et al. | |
| 2008/0061010 A1 * | 3/2008 | Tom | A01K 63/045 210/767 |
| 2010/0031893 A1 | 2/2010 | Bodlovich et al. | |
| 2010/0233146 A1 * | 9/2010 | McDaniel | A01N 63/02 424/94.2 |

* cited by examiner

SELF-CLEANING PRE-FILTER FOR A WATER CIRCULATION PUMP

BACKGROUND OF THE INVENTION

The present invention relates to submerged, low maintenance filters for pond water circulation pumps. More specifically, to a pre-pump filter system having a biological mechanism and an internal self-cleaning mechanism to actively filter water before it enters a circulation pump thus improving water quality and extending the life of the pump.

It is very difficult to keep clean an outdoor Koi pond, ornamental pond or other aquatic habitat stocked with fish (hereafter, a pond). A pond must be kept clean and aerated to maintain a healthy aquatic ecosystem, which typically requires a circulation pump and a water filtration system to move and clean the water. Small particles of debris and algae can pass through standard water circulation pumps, but larger pieces of debris quickly block these pumps, slow water flow and can eventually stop, damage or destroy the pumps. Most filters internal to or associated with pond water circulation pumps are primitive, complicated and require frequent cleaning, part replacement, and monitoring because they cannot effectively manage large quantities or pieces of debris.

One way of protecting the circulation pump is to use a pre-filter placed in line ahead of the pump to prevent large quantities and pieces of debris from entering the intake to the pump (hereafter, a pump intake pipe). However, pre-filters currently on the market are generally not well-suited for ponds because, when located in the pond, they are difficult to access, maintain and are unsightly. When the pre-filter is located outside the pond, the pump intake pipe frequently clogs. Pre-filters currently on the market are typically undersized and their designs actually encourage clogging, resulting in decreased water flow which strains the motor on the pond's circulation pump triggering a fail-safe shutdown of the pump or causing damage to the pump. In the case of a pre-filter rupture, the debris can quickly rush into the intake of the pump and completely compromise its operation.

What is needed is a submerged, low maintenance pre-filter that: (1) will withstand year-round use in an outdoor pond; (2) is of sufficient capacity that it will not easily clog; (3) can be submerged in a pond; (4) captures debris on a filtering surface so that it can be easily accessed by aquatic wildlife or mechanical cleaning methods; (5) can be raised above the bottom of the pond to optimize circulation and allow access to aquatic wildlife; (6) is self-cleaning; (7) may be easily camouflaged without affecting its operation.

SUMMARY OF INVENTION

The present invention is a pond water circulation pump pre-filter unit (PFU). The PFU is submerged and provides structural support for camouflage, which gives the system a natural aesthetic look and provides a space for fish to hide from non-aquatic predators. The PFU comprises at least two cleaning systems: (1) biological cleaning mechanism; and (2) an internal self-cleaning mechanism. Specifically, the PFU comprises several filtering surfaces that form a repository that collects pond debris and algae on which fish, snails, frogs, and salamanders (larval stage), crayfish, bacteria, etc. (hereafter, aquatic creatures) feed, i.e., the biological cleaning mechanism. These filtering surfaces of the PFU also serve as the protective barrier that prevents large debris from entering the circulation pump yet allow smaller, harmless particles to pass unimpeded. The internal self-cleaning mechanism is a water spray mechanism used to clean the PFU from the inside-out without removing the PFU from the pond, draining the pond or physically accessing the PFU. Together, these features of the PFU improve the quality of the water in the pond, lower maintenance costs, and extend the life of the pond's water circulation pump.

DETAILED DESCRIPTION OF THE INVENTION

The present invention is a water circulation pump pre-filter unit (PFU) supported by a frame having legs for placement of the PFU inside and at the bottom of a pond. The frame supports the filtering surfaces elevated above the bottom of the pond making them easily accessible to fish in the pond, increasing the total available surface area of the filtering surfaces to pond water, and making the filtering surfaces less prone to clogging. Additionally, by raising the filtering surfaces of the PFU off of the bottom of the pond, gravity will assist in pulling dense debris off of and down away from the PFU. The frame also provides support for camouflaging the PFU with risers and ornamental features, such as plants and pond rocks, without having these camouflaging materials touch the filtering surfaces or otherwise restrict water flow to the filtering surfaces or access by fish to the filtering surfaces.

The PFU comprises at least two cleaning systems: (1) a biological cleaning mechanism; and (2) an internal self-cleaning mechanism.

Regarding the biological cleaning mechanism, the PFU comprises several filtering surfaces that form a repository that collects pond debris on which aquatic creatures feed and provides a filter barrier to the water intake of the pond's circulation pump (hereafter a "screen cage"). More specifically, the screen cage prevents large debris from entering the circulation pump through the water intake system. The filtering surfaces of the screen cage are porous enough for water to freely flow through them, yet impermeable to large debris and other material that would be harmful to or overwork the circulation pump or the pond's other filter systems placed downstream from the pump. All of the mechanical parts of the PFU are located inside the screen cage providing maximum protection for the water intake to the pond's circulation pump and maximizing the available surface area to collect debris and algae, making it more difficult to clog. The suction created by the circulation pump holds debris and algae against the screen cage allowing fish to easily eat the debris and algae. By making each side of the screen cage accessible to the fish in the pond, the fish clean all sides of the screen cage by eating the debris and algae, masticating and/or digesting it into smaller particles that can pass safely through the pump.

The internal self-cleaning mechanism is a spray wash through a water supply pipe that complements the biological cleaning mechanism and doubles as a water supply for the pond. The water from the water source sprays the filtering surfaces of the screen cage from the inside, loosening impacted debris or carrying the debris away from the screen cage thereby opening spaces in the screen cage surface for water to pass. Additionally, agitating the debris in this way allows fish and other aquatic creatures to more readily access and consume it. The water source may be filtered and recycled pond water or water originating from an external source. This second cleaning mechanism may be used to clean the PFU without removing the PFU from the pond, draining the pond or physically accessing the PFU.

Together, the biological cleaning mechanism and the internal self-cleaning mechanism improve the quality of the water in the pond and extend the life of a pump. Hereafter "circulation pump" and "pump" are used interchangeably. The biological cleaning mechanism and the internal self-cleaning mechanism do not necessarily operate at the same time, rather the internal self-cleaning mechanism may be used intermittently to spray clean the screen cage or loosen debris that has caked on the filtering surfaces over time, while the biological cleaning mechanism keeps the screen cage clean the rest of the time. The screen cage is designed to have a total free-flowing surface area on the filter surfaces that is equal to or greater than the area of the aperture of the pump intake pipe.

Figure 1:
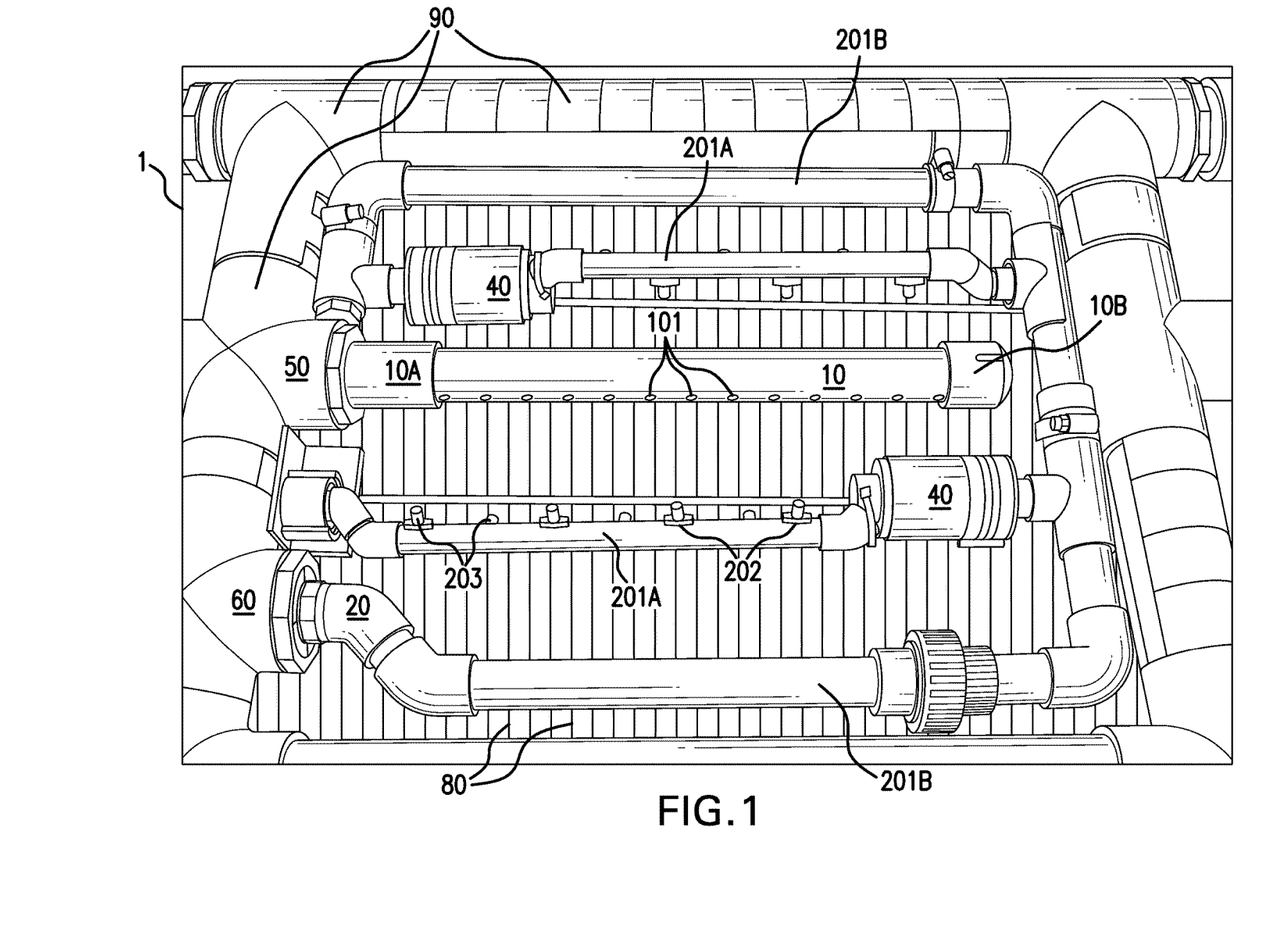
FIG. 1 shows an angle view of the PFU with the top filtering surface removed.

FIG. 1 shows an angle view of one embodiment of a PFU 1 with the top filtering surface of the screen cage removed. This embodiment illustrates the PFU 1 has a pump intake pipe 10, a water supply pipe 20, screen cage 80, and a frame 90. The pump intake pipe 10 has a plurality of holes 101 and is a conduit that attaches to an intake of a circulation pump through which water is suctioned or pulled from the pond by a circulation pump. In the present invention, the water pulled from the pond must first pass through the filtering surfaces on the screen cage 80 of the PFU. The pump intake pipe 10 has a proximal end 10A and a distal end 10B and is attached on the proximal end 10A to the pond's water circulation pump through a first port 50, which, in one embodiment, traverses the frame 90 and in another embodiment traverses the screen cage 80. A tube, hose or other device may be used to connect the first port 50 to the circulation pump.

In one embodiment (not shown), the water supply pipe 20 has at least one water supply pipe extension 201 having a plurality of holes to disperse outflowing water. In another embodiment, the plurality of holes are capped with nozzles to control the outflowing water spray. In another embodiment, the at least one water supply pipe extension 201 has a rotating section 201A and a non-rotating section 201B, with a water motor 40 interposed between the sections. In another embodiment, the plurality of holes 202 are on the rotating section 201A of the water supply pipe extension 201. In one embodiment, the water motor 40 is hollow, containing a circular interior chamber with a series of paddle-like protrusions extending from a central spindle.

The water supply pipe 20 is a conduit for the inflow of water into the pond through the PFU 1. Specifically, the water supply pipe 20 attaches to a garden hose or other water source through a second port 60 that, in one embodiment, traverses the frame 90. In another embodiment, the frame is hollow and water fills the frame 90 before exiting the second port 60. In another embodiment, the second port 60 traverses the screen cage 80. This water supply pipe 20 and water supply pipe extensions 201 are located inside the screen cage 80 and, in another embodiment, traverses both the frame 90 and the cage 80. In another embodiment, the water supply pipe 20 has at least two water supply pipe extensions 201 positioned on either side of the pump intake pipe 10. In one embodiment, the water supply pipe 20, water supply pipe extensions 201, and rotating sections 201A are PVC pipe. In another embodiment they are made of metal, plastic or other non-corrosive material.

When the water source is turned on, the water that enters the water supply pipe 20 travels to the water motor 40 which in turn causes the spindle on the water motor 40 to spin. This causes the paddles connected to the spindle to turn within the confines of the water motor 40. The spindle is attached to the rotating section 201A of the water supply pipe extensions 201 and causes the rotating section 201A to turn. Water exits the rotating sections 201A through the plurality of holes 202, in one embodiment capped by nozzles 203, spraying the outflowing water in specific directions from the inside of the screen cage 80 outward thus loosening debris that has settled on the outside surface of the screen cage 80. In another embodiment, the nozzles direct high-pressure water flow to focused areas and the nozzles are rotated to cover the majority of the filtering surfaces. The design of the internal self-cleaning mechanism may be of any particular design so long as it pushes enough water from inside the screen cage to clean debris and algae off of the filtering surfaces. In other embodiments, this may be accomplished using one or more rotating pipes, one or more rotating plates, or by a series of nozzles that are turned on and off by a control mechanism. In one embodiment, a pressurized air source is used to augment the water source. In another embodiment, the PFU is treated with a protective coating to prevent growth of algae or biofilms on the PFU.

In another embodiment, the water motors 40 and rotating sections 201A are eliminated from the PFU system. In one embodiment, this self-cleaning mechanism is an internal backwash using recycled, filtered water to clean the PFU. In an embodiment where an external water source is used, the PFU also fills the pond with water replacing water lost due to splashing, evaporation, and/or leaks.

Figure 2:
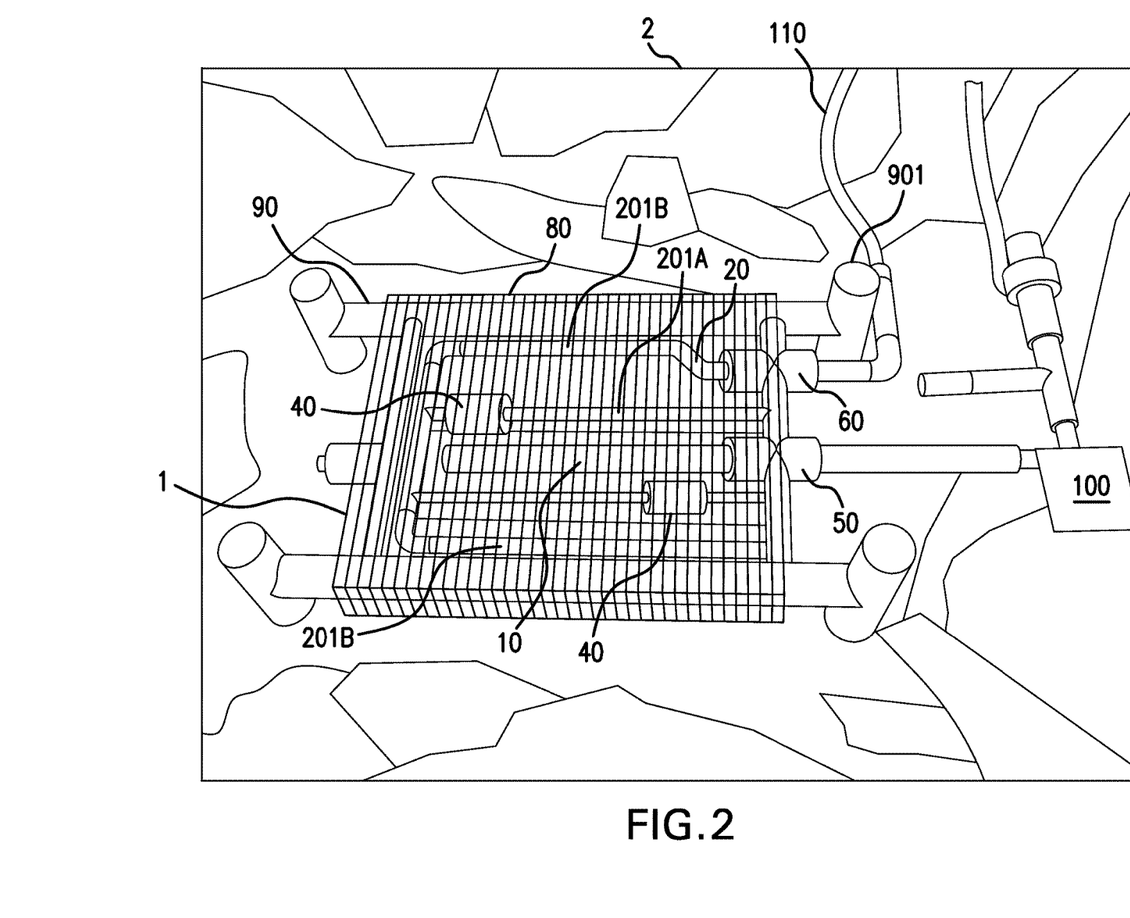
FIG. 2 shows a top view of the PFU operating in a pond.

FIG. 2 illustrates a view of the PFU 1 operating in a pond 2. This figure shows the pump intake pipe 10, water supply pipe 20 water motors 40, water supply pipe extensions 201 and rotating sections 201A inside the screen cage 80, a frame 90 having four leg supports 901, a circulation pump 100 attached to the first port 50, and a water source 110 attached to a second port 60. The frame leg supports 901 elevate the screen cage 80 above the bottom of the pond. This makes the filtering surfaces of the screen cage 80 easily accessible to fish from the top and bottom of the screen cage 80. In one embodiment, the legs 901 are adjustable with regard to height and placement under the frame 90.

Figure 3:
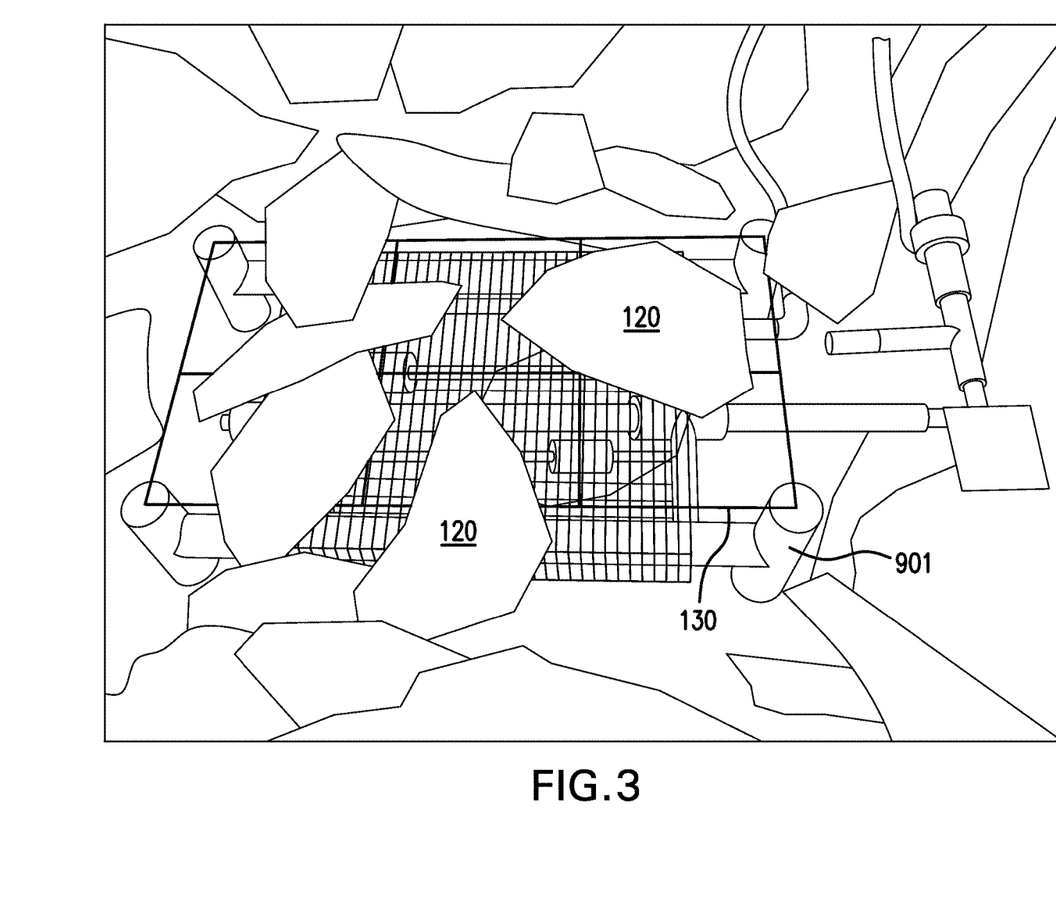
FIG. 3 shows a top view of a PFU partially camouflaged in a pond by ornamental rocks and a cutaway view of the PFU below.

Hiding man-made components on the bottom of a pond can be done in several ways, for example a single large rock covering the components, plants, or even some type of black material that matches the pond liner. To create a completely natural look, it is desirable to cover the entire pond floor in rocks and plants. But, placing rocks or planters directly onto a pond liner can cause problems. While these rocks and plants increase overall surface area for beneficial bacteria, they can also create locations where water does not circulate and where the oxygen becomes depleted. In these low-oxygen areas, anaerobic bacteria can thrive and begin to compete with beneficial bacteria creating toxins that can harm other aquatic creatures in the pond. The PFU allows for the aesthetic appearance of a rock bottom pond, while still allowing water flow below and around the rocks, which promotes a healthy ecosystem. FIG. 3 shows a top view of a PFU partially camouflaged in a pond by ornamental rocks 120 and a cutaway view of the PFU below. As shown, however, these ornamental rocks 120 are not actually on the bottom of the pond, but rather form a false bottom creating a space between the ornamental rocks 120 and the pond liner below. The PFU, the pump and other man-made components are placed in this space, concealing them and achieving a natural presentation when viewed from above. The space also provides a sanctuary for fish to escape non-aquatic predators.

Placing the PFU under a false bottom of ornamental rocks creates a problem. Specifically, hidden under the rocks, the user cannot see or easily access the pump or PFU. This necessitates the active internal cleaning mechanism illustrated in FIGS. 1 and 2, an active water spray wash for the PFU, which is accessible without removing the PFU from the pond, draining the pond or physically accessing the PFU.

In one embodiment, risers or other supports 130 are placed on top of the submerged PFU. These risers 130 support the ornamental rocks 120 so that the rocks will not damage the PFU or cause a tear in the screen cage 80. The risers 130 or other supports for the ornamental rocks 120 need to be made of materials that will not deteriorate or corrode in water. Sample materials include aluminum, stainless steel, polyvinyl chloride (PVC) and polypropylene plastic, or any combination of these materials. In one embodiment, the risers 130 are made from an old plastic pallet. The ornamental rocks 120 are both decorative and protective. They also provide a safe space for fish to hide from non-aquatic predators—cats, birds, children, etc.

Figure 4:
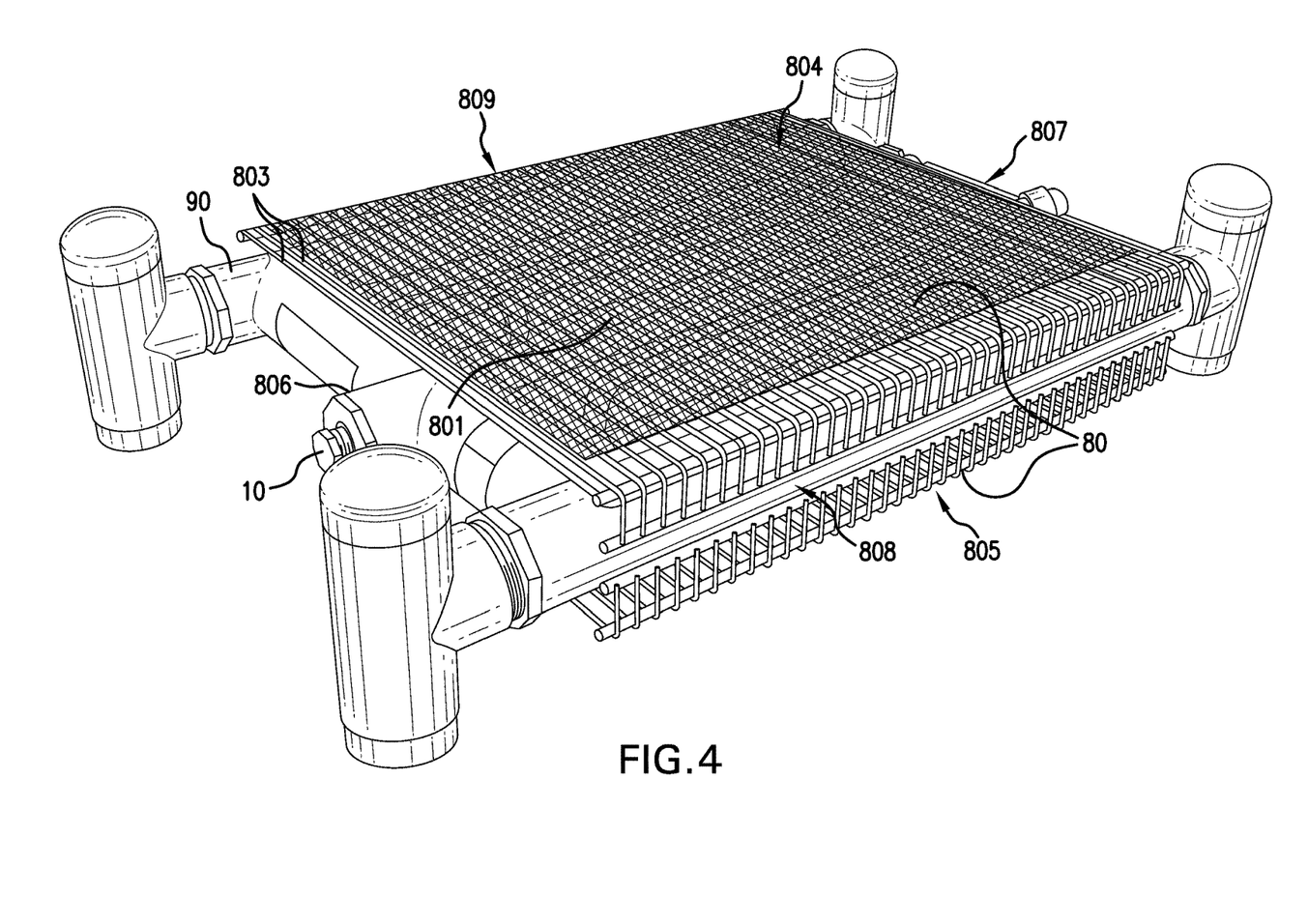
FIG. 4 shows an angle view of the PFU with the filtering surfaces in place.

FIG. 4 shows a rudimentary embodiment of the PFU with the screen cage 80. The screen cage 80 is a filtering surface comprising a plurality of filtering layers that include, for example, fine mesh screens (or "grates") 801 supported by powder-coated wire shelving 803. In this embodiment, the frame 90 and screen cage 80 are in the shape of a 3-dimensional rectangle screen cage 80 having a top 804, a bottom 805, front side 806, back side 807, a right end 808 and a left end 809. The fine mesh screens 801 on the top 804 and bottom 805 surfaces are the filtering surfaces. The screens collect debris that can be eaten by aquatic creatures in the pond and/or cleared away using the internal cleaning mechanism. The screens provide easy access for aquatic creatures to consume, masticate, or otherwise break up the debris into smaller pieces that can safely pass through the pump.

In one embodiment, the right end 808 and left end 809 of the screen cage are formed by the PFU frame 90 with only the top 804 and bottom 805 of the screen cage being filtering surfaces. That is, the front and back sides are closed by the PFU frame 90 itself while top 804 and bottom 805 are filtering surfaces of the screen cage 80. The PFU is, however, closed to large debris as the front side 806 and back side 807 are blocked by the PFU frame 90. That is, any water from the pond must pass through the screen cage to enter the pump intake pipe 10.

In another embodiment, the screen cage 80 completely surrounds the PFU 1 including its frame 90. As with other embodiments, water passes through the filtering surfaces into the pump intake pipe 10 and out of the pond through the pond's water circulation pump 100 and to the traditional water filter, wherein the water is treated and then returned to the pond 2. In another embodiment, the screen cage 80 and/or the filtering surfaces have the shape of a cylinder, sphere, pyramid, cone, prism, or other polyhedron. In another embodiment, the screen cage 80 has a pleated surface to provide additional surface area along the filtering surfaces.

Figure 5:
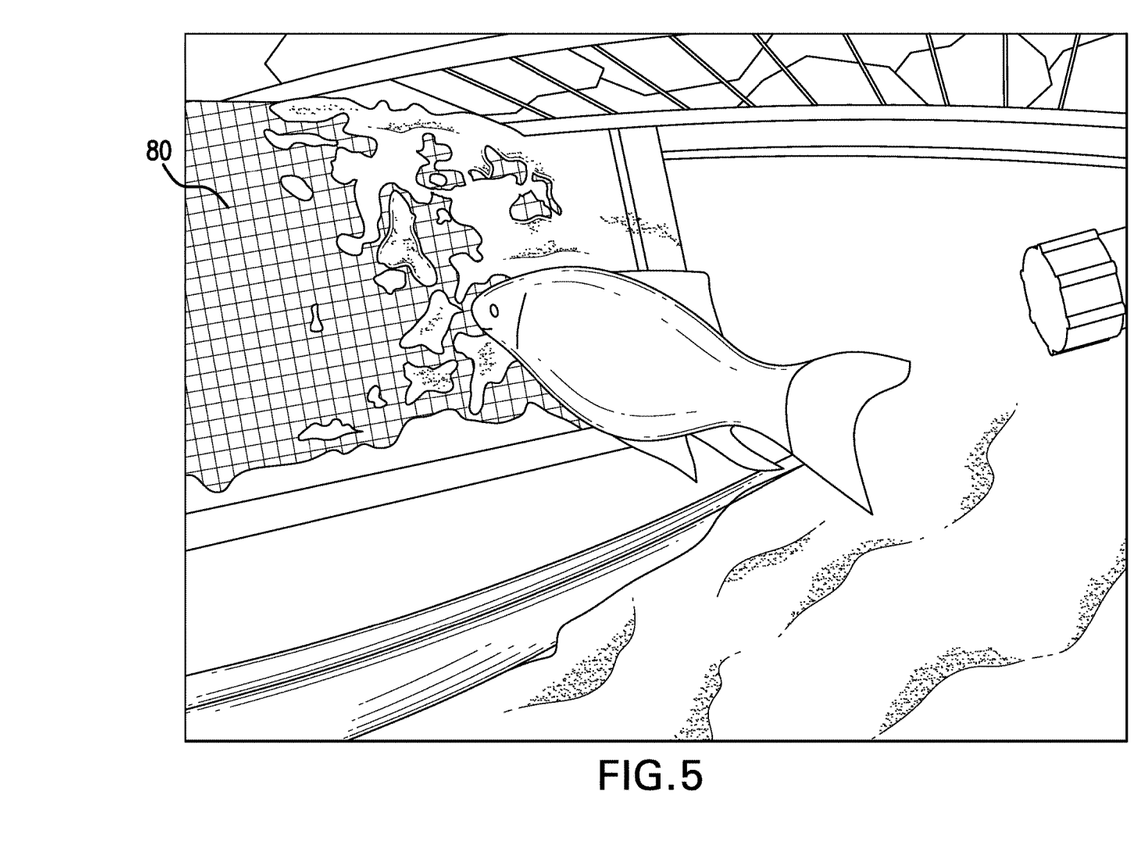
FIG. 5 shows a schematic of the PFU biological cleaning mechanism.

FIG. 5 is a schematic of the first cleaning mechanism of the PFU having aquatic creatures eat the debris deposited on the outside of the screen cage 80, i.e., the biological cleaning mechanism. Fish have been videotaped cleaning the outside of the screen cage, and this cleaning by the fish reduces the frequency that the internal cleaning mechanism needs to be used. The internal self-cleaning mechanism (implemented simply by turning on the water source connected to the water supply pipe 20) is needed only when the debris build-up on the outside of the screen cage 80 outpaces the appetite/eating capacity of and/or number of aquatic creatures in the pond. It is notable that Koi and goldfish are largely dormant in colder temperatures, so the frequency for using the internal self-cleaning mechanism may be temperature dependent. In one embodiment, the temperature of the pond 2 is controlled by adding warm water that is heated using solar panels and/or other methods of heating water known to those of ordinary skill in the art, to optimize the feeding activity of the aquatic creatures.

In one embodiment, the PFU has leg supports 901 built into the PFU. Support under the frame 90 allows the PFU to be placed at the bottom of a pond so that its filtering surfaces are not touching the bottom of the pond allowing free-flow of water and enough space for fish and other aquatic creatures to access the bottom surface of the screen cage 80. In another embodiment, the legs or supports are provided separately and placed underneath the PFU.

The present design contemplates the use of Koi and goldfish because they are the most common types of ornamental pond fish, however, other species of fish and other aquatic creatures may be used so long as they will eat the debris deposited on the PFU. In the present embodiment, common goldfish and Koi populate the pond. Both are extremely hardy and can survive temperature extremes. Also, they're both omnivores, eating a wide variety of foods. Algae is one of their main and favored food sources. Other fish species are contemplated as long as they can survive the climate and would do the same work as Koi and goldfish to fulfill the biological cleaning mechanism of the PFU.

In one embodiment, the screen cage 80 is made of multi-layer-mesh material. It may be made with only one mesh layer. Whatever the mesh strength or number of layers comprising the screen cage 80, the PFU should have sufficient strength and surface to distribute pressure over a wide area and to sustain function in places where high-point pressure loads can occur when the screen cage is dirty. This will vary pond to pond. The invention is not limited to ornamental ponds and may be used in any type of marine habitat where a water circulation pump is used and fish are present. The PFU can be sized and scaled accordingly for use by one of ordinary skill in the art from ornamental backyard ponds to industrial-level fish farms. Anywhere a circulation pump is used, the combined cleaning mechanisms of the PFU will improve the quality of the water and extend the life of the circulation pump. Compared to commercially available systems, maintenance of the PFU is minimal.

In one embodiment, the PFU has tolerated internal self-cleaning water pressures of 92 psi, the unregulated pressure supplied by a local municipal water source. As for water pressure created by the circulation pump pulling water through the screen cage, the PFU has tolerated pressures created by a 3200 gallon per hour pump. Distributing that load over a wider area and improving the strength of the screen cage 80 will prevent excessive pump pressure from tearing the screen cage 80 and/or crushing the PFU.

In one embodiment, the PFU has a circulation pump enclosed within the screen cage. This would create an "all-in-one" unit.

Other system features of the present invention, as described in detail above, include: that the PFU draws water into the circulation pump from at least two sides. It may draw from more sides depending on the shape and design of the frame and screen cage. There is no filter media other than the filtering surfaces in the PFU. Water flows freely through the two surfaces directly into a single point, the port 50 of the pump intake pipe 10. In one embodiment, the pump intake pipe 10 has a plurality of holes 101 to distribute the intake load across a wider area.

Particles that pass through the outside surfaces are small enough to pass easily through the pump without damaging it, thus there is no need for a filter media other than the filtering surfaces. Filter media would eventually clog the PFU and need to be pulled out, thus creating higher and more frequent maintenance. The PFU may work in concert with a biological filter outside the pond that uses filter media (foam mats and plastic bio-ball-like parts). The PFU is in line ahead of the pump to prevent over-sized debris from damaging the pump. The PFU is not intended to be a microbiological filter system, but rather a pre-filtering system.

Embodiments of this invention are described herein. Variations of those embodiments may become apparent to those having ordinary skill in the art upon reading the foregoing description. The inventors expect that skilled artisans will employ such variations as appropriate, and the inventors intend for the invention to be practiced other than as specifically described herein. Accordingly, this invention includes all modifications and equivalents of the subject matter recited in the claims appended hereto as permitted by applicable law. Moreover, any combination of the above-described elements in all possible variations hereof is encompassed by the invention unless otherwise indicated herein or otherwise clearly contradicted by context.

While the disclosure above sets forth the principles of the present invention, with the examples given for illustration only, one should realize that the use of the present invention includes all usual variations, adaptations and/or modifications within the scope of the claims attached as well as equivalents thereof.

All references, including publications, patent applications, and patents cited herein are hereby incorporated by reference to the same extent as if each reference was individually and specifically indicated to be incorporated by reference and was set forth in its entirety herein.

The use of the terms "a" and "an" and "the" and similar referents in the context of describing an invention (especially in the context of the following claims) are to be construed to cover both the singular and the plural, unless otherwise indicated herein or clearly contradicted by context. The terms "comprising," "having," "including," and "containing" are to be construed as open-ended terms (i.e., "including, but not limited to,") unless otherwise noted. Recitation of ranges as values herein are merely intended to serve as a shorthand method of referring individually to each separate value falling within the range, unless otherwise indicated herein, and each separate value is incorporated into the specification as if it was individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention (i.e., "such as, but not limited to,") unless otherwise claimed. No language in the specification should be construed as indicating any non-claimed element as essential to the practice of the invention.

Those skilled in the art will appreciate from the foregoing that various adaptations and modifications of the just described embodiments can be configured without departing from the scope and spirit of the invention. Therefore, it is to be understood that, within the scope of the appended claims, the invention may be practiced other than as specifically described herein.

What claimed is:

1. A pre-filter unit for a water circulation pump, comprising:
   (a) a pump intake pipe having, a proximal end, a distal end, a first length between the proximal end and the distal end, and a first port for connecting said pump intake pipe to a circulation pump;
   (b) a water supply pipe having a second port for connecting said water supply pipe to a water source;
   (c) at least one water supply pipe extension connected to said water supply pipe and having holes;
   (d) a submersible stationary screen and frame cage having an inside surface, an outside surface, a top side, a bottom side, a front side, a back side, and a second length between the front side and the back side, which cage provides a filter barrier on at least two sides for the circulation pump and the filter barrier is configured to collect algae and debris to form a repository;
   (e) a biological cleaning mechanism comprising said repository on the filter barrier as a food source for aquatic creatures; and
   (f) said cage above the bottom of a pond and configured to support a false bottom for the pond above the cage, and providing aquatic creatures access to said repository both above and below the cage; wherein said screen and frame cage having at least two members extending at least between the front side and the back side and between the top side and the bottom side;
   wherein said pre-filter unit draws water into the circulation pump through the filter barrier;
   wherein the first port of the pump intake pipe and the second port of the supply pipe are spaced apart and on the same side of the cage;
   wherein said pump intake pipe and said at least one water supply pipe extension are parallel to each other for substantially the length between the front side and the back side of the cage; wherein said pump intake pipe and said at least one water supply pipe extension are parallel to the at least two members; and
   wherein the at least one water supply pipe extension having holes is a mechanical self-cleaning mechanism configured to loosen algae and debris impacted in said filtering surfaces when the cage is submerged in water.

2. The pre-filter of claim 1, wherein said filtering surfaces have a total surface area that is greater than the area of said pump intake pipe aperture.

3. The pre-filter of claim 1, wherein said frame has leg supports for elevating said screen cage.

4. The pre-filter of claim 3, wherein said leg supports are adjustable.

5. The pre-filter of claim 1, wherein said pre-filter is treated with a protective coating to prevent the growth of algae or biofilms.

6. The pre-filter of claim 1, wherein the circulation pump holds algae and debris against the outside of the screen cage by suction.

7. The pre-filter of claim 1, wherein the screen cage has the shape of a cylinder, sphere, pyramid, cone, prism, or other polyhedron.

8. The pre-filter of claim 1, wherein the circulation pump is inside the screen cage.

9. The pre-filter of claim 1, wherein the first port and the second port traverse the frame.

10. The pre-filter of claim 1, further comprising a hollow frame that fills with water before exiting the second port.

11. The pre-filter of claim 1, further wherein each of the pump intake pipe, the water supply pipe and the at least one water supply pipe extension are inside the cage and the first port of the pump intake pipe and the second port of the water supply pipe are outside the cage.

12. The pre-filter of claim 1, further wherein the length of said intake pipe from its distal end to its proximal end is substantially the same as the length of the cage.

13. A method for cleaning water to extend the life of a water circulation pump comprising filtering algae and debris that could clog or damage said circulation pump from the water using a pre-filter unit comprising:
(a) a pump intake pipe having a proximal end, a distal end, a first length between the proximal end and the distal end, and a first port for connecting said pump intake pipe to a circulation pump;
(b) a water supply pipe having a second port for connecting said water supply pipe to a water source;
(c) at least one water supply pipe extension having holes connected to said water supply pipe;
(d) a submersible stationary screen and frame cage having an inside surface, an outside surface, a top side, a bottom side, a front side, a back side, and a second length between the front side and the back side, and which cage provides a filter barrier on at least two sides for the circulation pump and the filter barrier is configured to collect algae and debris to form a repository;
(e) a biological cleaning mechanism comprising said repository on the filter barrier as a food source for at least one fish; and
(f) said cage above the bottom of a pond and configured to support a false bottom for the pond above the cage, and providing the at least one fish access to said repository both above and below the cage; wherein said screen and frame cage having at least two members extending at least between the front side and the back side and between the top side and the bottom side;
wherein said pre-filter unit draws water into the circulation pump through the filter barrier;
wherein the first port of the pump intake pipe and the second port of the supply pipe are spaced apart and on the same side of the cage;
wherein said pump intake pipe and said at least one water supply pipe extension are parallel to each other for substantially the first length between the proximal end and the distal end of the pump intake pipe and for substantially the second length between the front side and the back side of the cage; wherein said pump intake pipe and said at least one water supply pipe extension are parallel to the at least two members; and
wherein the at least one water supply pipe extension having holes is a mechanical self-cleaning mechanism configured to loosen algae and debris impacted in said filtering surfaces when the cage is submerged in water.

14. The method of claim 13, wherein said pre-filter further comprises a water source and a pressurized air source augmenting the water source.

15. The method of claim 13, further comprising submerging the pre-filter unit in the water being filtered.

16. The method of claim 13, wherein said mechanical self-cleaning mechanism is a water spray mechanism for cleaning the pre-filter unit without removing the unit from the water being cleaned, draining the water, or physically accessing the unit.

17. The pre-filter of claim 13, further wherein each of the pump intake pipe, the water supply pipe and the at least one water supply pipe extension are inside the cage and the first port of the pump intake pipe and the second port of the water supply pipe are outside the cage.

18. The pre-filter of claim 13, further wherein the length of said intake pipe from its distal end to its proximal end is substantially the same as the length of the cage.

19. A pre-filter unit for a water circulation pump, comprising:
a pump intake pipe having a proximal end, a distal end, a first length between the proximal end and the distal end, and a first port for connecting said pump intake pipe to said circulation pump;
a water supply pipe having a second port for connecting said water supply pipe to a water source;
at least one stationary water supply pipe extension having holes connected to said water supply pipe;
a submersible stationary screen and frame cage formed by a frame having a second length between a front side and a back side, and at least two filtering surfaces, each of the at least two filtering surfaces having an inside and an outside surface and configured to collect algae and debris;
the at least two filtering surfaces being stationary and accessible to aquatic creatures; and
the frame configured to support a false bottom for a pond above the cage and to provide aquatic creatures access to said filtering surface above the cage; wherein said screen and frame cage having at least two members extending at least between the front side and the back side and between the top side and the bottom side;
wherein said pre-filter unit draws water into the circulation pump from the outside surface of the at least two filtering surfaces;
wherein debris is blocked from entering the pre-filter unit by the frame and the at least two filtering surfaces;
wherein the first port of the pump intake pipe and the second port of the supply pipe are spaced apart and on the same side of the cage;
wherein said pump intake pipe and said at least one water supply pipe extension are parallel to each other for substantially the length between the front side and the back side of the cage; wherein said pump intake pipe and said at least one water supply pipe extension are parallel to the at least two members; and
wherein the at least one stationary water supply pipe extension having holes is configured with one or more nozzles for spraying water from inside said cage to loosen algae and debris impacted in said filtering surfaces when the cage is submerged in water.

20. The pre-filter of claim 19, wherein said pre-filter further comprises a water source and a pressurized air source augmenting said water source.

21. The pre-filter of claim 19, wherein said pre-filter is treated with a protective coating to prevent the growth of algae or biofilms.

22. The pre-filter of claim 19, wherein said one or more nozzles are turned on and off by a control mechanism.

23. The pre-filter of claim 19, wherein said filtering surfaces have a total surface area that is greater than the area of said pump intake pipe aperture.

24. The pre-filter of claim 19, wherein said frame has leg supports for elevating said screen cage.

25. The pre-filter of claim 19, further wherein each of the pump intake pipe, the water supply pipe and the at least one water supply pipe extension are inside the cage and the first port of the pump intake pipe and the second port of the water supply pipe are outside the cage.

26. The pre-filter of claim 19, further wherein the length of said intake pipe from its distal end to its proximal end is substantially the same as the length of the cage.

* * * * *